(12) United States Patent
Nishi et al.

(10) Patent No.: US 6,656,553 B2
(45) Date of Patent: Dec. 2, 2003

(54) HOSE FOR FUEL

(75) Inventors: Eiichi Nishi, Kanagawa (JP); Masako Nagashima, Kanagawa (JP); Noriyuki Isobe, Yamaguchi (JP); Tomoharu Nishioka, Yamaguchi (JP); Yoshiro Iwata, Yamaguchi (JP)

(73) Assignees: Asahi Glass Company, Limited, Tokyo (JP); Ube Industries, Ltd., Ube (JP)

( * ) Notice: Subject to any disclaimer, the term of this patent is extended or adjusted under 35 U.S.C. 154(b) by 0 days.

(21) Appl. No.: 10/265,328

(22) Filed: Oct. 7, 2002

(65) Prior Publication Data

US 2003/0035914 A1 Feb. 20, 2003

Related U.S. Application Data

(63) Continuation of application No. PCT/JP01/03517, filed on Apr. 24, 2001.

(30) Foreign Application Priority Data

Apr. 24, 2000 (JP) .......................................... 2000-121926
Mar. 30, 2001 (JP) .......................................... 2001-98059

(51) Int. Cl.$^7$ ............................. B32B 1/08; F16L 9/133; F16L 11/00
(52) U.S. Cl. ................ 428/36.91; 428/35.7; 428/474.4; 428/476.3; 138/137; 138/141
(58) Field of Search ............................. 428/35.7, 36.91, 428/474.4, 476.3; 138/137, 141

(56) References Cited

U.S. PATENT DOCUMENTS

| | | | | |
|---|---|---|---|---|
| 4,225,379 A | * | 9/1980 | Ishii et al. ..................... | 216/35 |
| 5,250,226 A | * | 10/1993 | Oswal et al. ................ | 252/500 |
| 6,299,630 B1 | * | 10/2001 | Yamamoto ................... | 606/205 |
| 6,354,331 B1 | * | 3/2002 | Fisher et al. ................. | 138/104 |
| 6,372,870 B1 | * | 4/2002 | Kitahara et al. ............. | 526/250 |

FOREIGN PATENT DOCUMENTS

| | | |
|---|---|---|
| EP | 0 650 987 A1 | 5/1995 |
| EP | 0 957 148 | 11/1999 |
| WO | WO 96/05965 | 2/1996 |
| WO | WO 98/05493 | 2/1998 |

* cited by examiner

*Primary Examiner*—Sandra M. Nolan
*Assistant Examiner*—Chris Bruenjes
(74) *Attorney, Agent, or Firm*—Oblon, Spivak, McClelland, Maier & Neustadt, P.C.

(57) ABSTRACT

A hose for fuel having a laminated structure comprising an inner layer (A) made of a ethylene/tetrafluoroethylene copolymer adhesive to a polyamide resin and an outer layer (B) made of a polyamide resin, is formed. Such a hose for fuel is excellent in interlaminar adhesive strength and also excellent in antistatic properties and fuel permeation-preventing properties, and particularly, the dependency of the interlaminar adhesive strength on the take-up speed during the co-extrusion molding, is small.

14 Claims, No Drawings

HOSE FOR FUEL

TECHNICAL FIELD

The present invention relates to a laminated hose for fuel transportation (which is referred to simply as a hose for fuel in the present invention) excellent in the interlaminar adhesive strength and also excellent in the antistatic properties and fuel permeation-preventing properties.

More particularly, it relates to a hose for fuel which shows an interlaminar adhesive strength of at least 20 N/cm even at a high take-up speed of 50 m/min and which has a small dependency of the interlaminar adhesive strength on the take-up speed during the production of the hose.

BACKGROUND ART

Heretofore, a fluororesin is used in a wide range of fields, since it is excellent in heat resistance, chemical resistance, weather resistance, non-tackiness, low abrasion properties, low dielectric characteristics, etc. For example, as an important application of a laminate, a hose for fuel or the like may be mentioned which is used in an engine room of an automobile, where it is exposed to a severe condition such as a high temperature environment. The hose for fuel is a hose for pipings to transport a gasoline fuel containing an alcohol or an aromatic compound.

In recent years, the regulations relating to permeation of gasoline through a hose for fuel have become stricter, and as a counter measure to comply therewith, a hose for fuel having a multilayer structure such as a double layer structure, has been proposed. Especially for the inner layer which is directly in contact with the fuel, it is desired to use a resin having chemical resistance against a corrosive material such as ethanol or methanol present in the fuel and having a gas barrier property not to let such a material permeate therethrough. From this viewpoint, as a material for the inner layer, a fluororesin having heat resistance, chemical resistance and gas barrier properties, is considered to be one of the most preferred materials. However, in a case where static electricity is formed and charges are built up when a liquid fuel passes through the hose for fuel made of a fluororesin, it becomes necessary to discharge the formed static electricity by a method such as imparting conductivity to the fluororesin.

On the other hand, for the outer layer of the hose for fuel, it is common to employ a polyamide resin such as polyamide 6, polyamide 11 or polyamide 12 which is usually relatively durable.

A laminate constituting the hose for fuel, is required to have firm interlaminar adhesive strength to avoid interlaminar peeling during the processing or use. As a means to improve the adhesive strength, there may, for example, be mentioned a method of employing an adhesive resin, or a method wherein a fluororesin tube is preliminarily formed and subjected to surface treatment, and then, a polyamide resin is coated therearound. Especially, a coextrusion molding method employing an adhesive resin may be mentioned as a low cost method, since no surface treatment step is required.

Heretofore, when it was attempted to construct a hose for fuel having a laminated structure comprising an inner layer made of a fluororesin and an outer layer made of a polyamide resin, there was the following problem. Namely, as the fluororesin is essentially poor in the adhesive properties, no adequate adhesive strength can be obtained, even if a tube or film of a fluororesin is coated with a material made of a polyamide resin of the outer layer directly. Further, even when an adhesive strength of a certain degree can be obtained, the adhesive strength is likely to vary depending upon the type of the polyamide resin, and the adhesive strength tends to be practically inadequate in many cases.

Since it has been difficult to bond a fluororesin of the inner layer directly to the polyamide resin of the outer layer, it has been attempted to interpose an adhesive resin layer having an adhesive performance to both the fluororesin and the polyamide resin, between the two layers.

As such an adhesive layer to be interposed between the layers, for example, a mixture comprising a polyamide resin and a fluororesin (JP-A-7-53823, JP-A-7-53824, JP-A-8-156199, JP-A-4-224939, JP-A-8-258212, etc.), or an adhesive fluororesin (JP-A-9-194815, etc.) has, for example, been proposed.

However, even such a hose for fuel having an adhesive resin layer interposed, has had a problem that the adhesive strength between the fluororesin layer and the polyamide resin layer varies depending on the forming condition, particularly on the take-up speed, and an adequate adhesive strength can not constantly be obtained.

DISCLOSURE OF THE INVENTION

The object of the present invention is to solve the above-mentioned problems and to obtain a hose for fuel comprising an outer layer made of a polyamide resin and an inner layer made of a fluororesin, particularly an ethylene/tetrafluoroethylene copolymer, which is excellent in the adhesive strength between the inner layer and the outer layer and also excellent in the antistatic properties and fuel-permeation-preventing properties, whereby the interlaminar adhesive strength does not substantially depend on the take-up speed.

The present inventors have conducted an extensive study to solve the above-mentioned problems and as a result, have found that by laminating an adhesive polyamide resin and an adhesive ethylene/tetrafluoroethylene copolymer, a hose for fuel having a layered structure of at least two layers having such both layers bonded extremely firmly, can be obtained, and the present invention has been accomplished.

Namely, the present invention provides the following hose for fuel.

A hose for fuel having a laminated structure comprising an inner layer (A) made of an ethylene/tetrafluoroethylene copolymer and an outer layer (B) made of a polyamide resin, wherein the inner layer (A) is made of an ethylene/tetrafluoroethylene copolymer adhesive to a polyamide resin, and the outer layer (B) is made of polyamide 12(a) satisfying the formula (1), or a mixture of polyamide 12(a) satisfying the formula (1) and polyamide 12(b) satisfying the formula (2), wherein the polyamides 12(a) and 12(b) satisfy the formula (3) and are polyamide resins showing an adhesive strength of at least 20N/cm to the inner layer (A):

$$[COOH]+[NH_2] \geq 2 \times 10^2/(17.8\eta_{r(a)}-19.1) \tag{1}$$

$$[COOH]+[NH_2] < 2 \times 10^2/(17.8\eta_{r(b)}-19.1) \tag{2}$$

$$\eta_{r(b)} - \eta_{r(a)} \geq 0.3 \tag{3}$$

wherein [COOH] is the equivalent concentration of polyamide terminal carboxyl groups, [NH$_2$] is the equivalent concentration of polyamide terminal amino groups, and $\eta_{r(a)}$ and $\eta_{r(b)}$ are the relative viscosities of polyamides 12(a) and 12(b), respectively.

BEST MODE FOR CARRYING OUT THE INVENTION

In the hose for fuel of the present invention, one constituting the inner layer (A) is basically an ethylene/tetrafluoroethylene copolymer (hereinafter sometimes referred to simply as ETFE).

Preferred as ETFE, is one having tetrafluoroethylene and ethylene copolymerized in a ratio of from 70/30 to 30/70 (molar ratio), or a copolymer having these monomers further copolymerized with at least one fluoroolefin or other copolymerizable monomer other than ethylene, such as propylene. More preferred is a copolymer having tetrafluoroethylene/ethylene/other copolymerizable monomer copolymerized in a molar ratio of 30 to 60/20 to 60/0 to 40, particularly 40 to 60/35 to 60/0 to 5.

As such other copolymerizable monomer, an α-olefin such as propylene or butene, a fluoroolefin having hydrogen atoms in an unsaturated group, such as vinyl fluoride, vinylidene fluoride or a (perfluoroalkyl)ethylene such as (perfluorobutyl)ethylene, a vinyl ether such as an alkyl vinyl ether or a (fluoroalkyl)vinyl ether, a vinyl ester such as vinyl acetate or vinyl butyrate, a (meth)acrylate such as a (fluoroalkyl)acrylate or a (fluoroalkyl)methacrylate, or a monomer having no hydrogen atom in an unsaturated group except for tetrafluoroethylene, such as hexafluoropropylene or a perfluoro(alkyl vinyl ether), may, for example, be mentioned, and they may be used in combination. As mentioned above, ETFE is used to mean an ethylene/tetrafluoroethylene copolymer including a copolymer with other copolymerizable monomer.

Particularly preferred as ETFE in the present invention is an ethylene/tetrafluoroethylene/vinyl acetate/(perfluoroalkyl)ethylene copolymer wherein the molar ratio of polymerized units based on ethylene to polymerized units based on tetrafluoroethylene is from 30/70 to 70/30, and based on the total number of mols of polymerized units based on ethylene and tetrafluoroethylene, polymerized units based on vinyl acetate are from 0.1 to 15 mol %, and polymerized units based on (perfluoroalkyl)ethylene are from 0.01 to 5 mol %.

In the present invention, ETFE can be produced by various known polymerization methods such as bulk polymerization, suspension polymerization, emulsion polymerization and solution polymerization. Here, a batch system or continuous system operation using agitation type polymerization apparatus of a single vessel or multi vessel system, or a tube type polymerization apparatus, may be employed. ETFE obtained by any method, may be employed suitably for the purpose of the present invention.

In the present invention, ETFE is characterized in that it is an adhesive polymer to a polyamide resin. Here, the "adhesive polymer" is ETFE having an adhesive property to a polyamide resin. Specifically, it means ETFE having treatment to impart an adhesive property applied i.e. having functional groups to impart an adhesive property introduced.

Functional groups to impart an adhesive property are groups having reactivity or polarity. For example, a carboxyl group, a residue having two carboxyl groups in one molecule undergone dehydration condensation (hereinafter referred to as a carboxylic anhydride residue), an epoxy group, a hydroxyl group, an isocyanate group, an ester group, an amide group, an aldehyde group, an amino group, a hydrolyzable silyl group, a cyano group, a carbon-carbon double bond, a sulfo group and an ether group may be mentioned as preferred examples. Among them, a carboxyl group, a carboxylic anhydride residue, an epoxy group, a hydrolyzable silyl group and a carbon-carbon double bond are preferred. As such functional groups, two or more different types may be present in one molecule of ETFE, and two or more may be present in one molecule.

A method for introducing such functional groups may be (1) a method wherein a compound having a bonding group which can be grafted and a functional group to impart an adhesive property (hereinafter referred to as a grafting compound), is grafted to ETFE, (2) a method wherein at least one functional group is incorporated to the above-described copolymerizable monomer which is used during the polymerization of ETFE, or (3) a method wherein ETFE is modified by e.g. a free radical, or a method wherein scission of the molecular chain is caused to reduce the molecular weight.

(1) The method for grafting ETFE is a method of grafting a grafting compound to ETFE. For example, reference is made to JP-A-7-173446, JP-A-10-311461, etc.

Specifically, ETFE, a grafting compound and a free radical-generating agent are melted and mixed at a temperature where free radicals will be generated, whereby the grafting compound is grafted to ETFE. Most preferred is a method of carrying out the grafting while melt kneading the mixture in a cylinder of an extrusion molding machine or an injection molding machine. ETFE having functional groups introduced by the grafting can be made into a molded material in the form of e.g. pellets. Further, it is also preferred that, as described hereinafter, grafting is carried out in a molding machine such as an extrusion molding machine, followed by multilayer extrusion or the like to obtain a molded product such as a multilayered hose.

Here, the grafting compound is a compound having the above-mentioned functional group such as a carboxyl group and a bonding group such as an organic group having an α, β-unsaturated double bond at a terminal, a peroxy group or an amino group. For example, an unsaturated carboxylic acid, an epoxy group-containing unsaturated compound, a hydrolyzable silyl group-containing unsaturated compound or an epoxy group-containing peroxy compound, may be mentioned. An unsaturated carboxylic anhydride such as maleic anhydride or fumaric anhydride is most preferred. The grafting compound is preferably used in an amount of from 0.01 to 100 parts by mass, per 100 parts by mass of ETFE.

As the free radical generating agent, one having a decomposition temperature within a range of from 120 to 350° C. and a half-life period of about one minute is preferred. For example, a ketone peroxide, a dialkyl peroxide such as 2,5-dimethyl-2,5-bis(tert-butylperoxy)hexane, a peroxydicarbonate such as diisopropyl peroxydicarbonate, a hydroperoxide such as tert-butyl hydroperoxide, an alkyl perester such as tert-butyl peroxyisobutylate, a diacyl peroxide such as dichlorobenzoyl peroxide or benzoyl peroxide, dicumyl peroxide, or lauroyl peroxide, may be mentioned. Such an agent is preferably used in an amount of from about 0.1 to 10 parts by mass per part by mass of the grafting compound.

(2) In the method of incorporating a functional group to at least one of the above-described copolymerizable monomers which are used during the polymerization of ETFE, the following (a) to (e) may, for example, be mentioned as the functional group-containing monomers to be used.

(a) a perfluoro vinyl ether type monomer represented by $R_f(OCFXCF_2)_mOCF=CF_2$ (wherein $R_f$ is a $C_{1-6}$ perfluoroalkyl group, X is a fluorine atom or a trifluoromethyl group, and m is an integer of from 1 to 6), (b) a perfluoro vinyl ether type monomer having a group readily convertible to a carboxylic group or a sulfo group, such as CH$_3$OC(=O)CF$_2$CF$_2$CF$_2$OCF=CF$_2$ or FSO$_2$CF$_2$CF$_2$OCF(CF$_3$)CF$_2$OCF=CF$_2$, (c) a vinyl ester type monomer such as vinyl acetate, (d) a vinyl ether type monomer such as ethyl vinyl ether, cyclohexyl vinyl ether or hydroxybutyl vinyl ether, and (e) an allyl ether type monomer such as methyl allyl ether. These copolymerizable monomers may be used alone or in combination of two or more of them. Further, a functional group may be developed by e.g. a free radical, or a compound containing a functional group may be employed as a polymerization initiator.

(3) The method of modifying ETFE or the method of causing the molecular chain scission to reduce the molecular weight by e.g. free radicals, may, for example, be a method wherein a peroxide is blended in an amount of from about 0.01 to 9 parts by mass per 100 parts by mass of ETFE, followed by melt kneading at a temperature of at least the decomposition temperature of the peroxide and by the free radicals generated, ETFE is modified, or scission of the molecular chain is caused to reduce the molecular weight (see JP-A-11-320770).

In the present invention, the treatment for introducing a functional group to impart an adhesive property, includes treatment to impart an adhesive property by modifying ETFE or causing the molecular chain scission to reduce the molecular weight as mentioned above. Thus, as another method, it may be treatment to impart an adhesive property by modifying ETFE or by reducing the molecular weight by irradiating e.g. high energy rays or by heat treatment at a temperature of at least 300° C., preferably from 330 to 400° C., for from 5 to 30 minutes.

To ETFE for forming the inner layer (A) of the hose for fuel of the present invention, further optional components such as another thermoplastic resin, a filler such as silica, carbon, glass fiber or carbon fiber, a pigment, a plasticizer, an adhesion-imparting agent, a silane coupling agent, a flame retardant and an optical stabilizer, may be mixed within a range not to impair its performance.

In the hose for fuel of the present invention, the outer layer (B) is constituted by a polyamide resin. In the present invention, the polyamide resin (hereinafter sometimes referred to simply as PA) is also characterized in that it is an adhesive polymer. The "adhesive polymer" means that like in the case of ETFE, it is an adhesive polyamide resin having treatment to impart an adhesive property applied.

Various types may be available as such an adhesive polyamide resin. However, basically, the numbers of terminal amino groups and terminal carboxyl groups, and the relative viscosity of the resin, are defined within the specific ranges. Among them, preferred is polyamide 12 (hereinafter sometimes referred to as PA12) having a polymerized unit represented by the formula (4), having an amide bond (—CONH—):

(—CO—(CH$_2$)$_{11}$—NH—)  (4)

Such adhesive polyamide 12 is preferably polyamide 12(a) satisfying the formula (1), or a mixture of polyamide 12(a) satisfying the formula (1) and polyamide 12(b) satisfying the formula (2), and the polyamide 12(a) and polyamide 12(b) are preferably a polyamide mixture satisfying the formula (3):

[COOH]+[NH$_2$]≧2×10$^2$/(17.8η$_{r(a)}$−19.1)  (1)

[COOH]+[NH$_2$]<2×10$^2$/(17.8η$_{r(b)}$−19.1)  (2)

η$_{r(b)}$−η$_{r(a)}$≧0.3  (3)

wherein [COOH] is the equivalent concentration of polyamide terminal carboxyl groups, [NH$_2$] is the equivalent concentration of polyamide terminal amino groups, and η$_{r(a)}$ and η$_{r(b)}$ are the relative viscosities of polyamides 12(a) and 12(b), respectively.

Here, [COOH] and [NH$_2$] are values obtainable from the titers by an alkali and an acid, respectively.

In the above, the terminal carboxyl group and terminal amino group concentrations and the relative viscosities (η$_r$) are values measured by the methods which will be described hereinafter.

Further, in the present invention, the upper limit of [COOH]+[NH$_2$] in the formula (1) is preferably at most 30. If [COOH]+[NH$_2$] is larger than 30, the molecular weight will be low, and continuous stabilized pelletizing tends to be difficult.

In the present invention, an adhesive strength of at least 20 N/cm will be shown by laminating the outer layer (B) of a polyamide resin made of such an adhesive polyamide resin on the inner layer (A) made of ETFE.

In the present invention, such an adhesive polyamide resin may be the above-mentioned single polyamide 12(a) or a mixture (blend) of polyamide 12(a) and polyamide 12(b). When the mixture is used, the mass ratio of polyamide 12(a) to polyamide 12(b) is preferably from 2 to 60/40 to 98 (% by mass), more preferably from 5 to 50/50 to 95 (% by mass).

The mechanism of how the adhesive property can be imparted by the blend of polyamide 12(a) and polyamide 12(b), as mentioned above, is not clearly understood, but is considered to be as follows. It is considered that since there is a difference between the two in the viscosity when melted, during the coextrusion molding with ETFE, adhesive polyamide 12(a) having a lower viscosity will selectively be distributed in the vicinity of the interface of ETFE and the polyamide resin, whereby a laminate is obtainable which has a high adhesive strength developed between the layers.

In the present invention, the polyamide 12(a) satisfying the formula (1) is not particularly limited. For example, it can be obtained by using 12-aminododecanoic acid and/or dodecane lactam as the main component and incorporating a polyfunctional monomer such as a diamine, a triamine, a dicarboxylic acid or a tricarboxylic acid thereto in order to improve the adhesive property, followed by polymerization.

As the diamine to be incorporated for polymerization, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-dodecanediamine, 2,2,4-trimethylhexamethylenediamine, 1,3-diaminocyclohexane, m-xylenediamine, p-xylylenediamine, norbornanediaminomethyl or isophoronediamine may, for example, be mentioned.

As the triamine to be incorporated for polymerization, diethylenetriamine, bis(pentamethylene)triamine, bis(hexamethylene)triamine, bis(heptamethylene)triamine, bis(octamethylene)triamine, bis(nonanemethylene)triamine, bis(decanemethylene)triamine, bis(decamethylene)triamine, bis(dodecamethylene)triamine or tris(2-aminoethyl)amine may, for example, be mentioned.

As the dicarboxylic acid to be incorporated for polymerization, adipic acid, pimelic acid, suberic acid, azelaic acid, sebacic acid, undecanedioic acid, dodecanedioic acid, tridecanedioic acid, 1,2-cyclohexanedicarboxylic acid, isophthalic acid or terephthalic acid may, for example, be mentioned.

As the tricarboxylic acid to be incorporated for polymerization, 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid or trimesic acid may, for example, be mentioned.

The amount of such a polyfunctional monomer is preferably from 0.2 to 10 mass %, more preferably from 0.5 to 10 mass %, based on 12-aminododecanoic acid and/or dodecane lactam.

In the present invention, polyamide 12(b) satisfying the formula (2), can be obtained by a conventional method, for example, by polymerizing 12-aminododecanoic acid and/or dodecane lactam.

The polyamide resin is basically the one obtained by polymerizing the above described monomer. However, it may be one having at least one other monomer copolymerized thereto within a range not to impair the purpose of the present invention and within a range of less than 50 mass %, preferably at most 40 mass %, more preferably at most 30 mass %, most preferably at most 20 mass %.

As such other monomer to be used for copolymerization, for example, ε-caprolactam, 6-aminocaproic acid, ε-enanthlactam, 7-aminoheptanoic acid, α-pyrrolidone, α,-piperydone, 11-aminoundecanoic acid, undecanelactam, a diamine such as hexamethylenediamine, nonamethylenediamine, undecamethylenediamine or dodecamethylenediamine, or a dicarboxylic acid such as terephthalic acid, isophthalic acid, adipic acid or sebacic acid, may be mentioned.

The polyamide resin in the present invention can be produced from the above-mentioned monomer by a polyamide polymerization method known per se such as a batch polymerization method or a continuous polymerization method. The apparatus to be used for the polymerization may, for example, be preferably a batch system reactor, a single tank system or multi tank system continuous polymerization apparatus, a tubular continuous polymerization apparatus or a kneading reaction extruder.

The production process may be carried out preferably as divided into a prepolymerization step wherein a ring-opening reaction or an initial polycondensation is carried out in a molten state and a subsequent post polymerization step wherein polycondensation is carried out in a molten state under atmospheric pressure or reduced pressure to obtain a high molecular weight product. Further, in order to promote polymerization, it is also preferred to employ a solid phase polymerization method.

The polyamide resin to be used in the present invention is basically the one obtained by polymerizing the above-mentioned monomer. However, other polyamide resin or a resin other than a polyamide resin may be mixed thereto within a range not to impair the purpose of the present invention and within a range of not more than 40 mass %, preferably not more than 30 mass %, more preferably not more than 20 mass %.

The polyamide resin to be mixed may, for example, be polyamide 6, polyamide 66, polyamide 11, polyamide 6·10, polyamide 6·12, polyamide 12·12, polyamide 6/66 copolymer or polyamide 6/12 copolymer. As the polymer other than a polyamide resin, polypropylene, an acrylonitrile/butadiene/styrene copolymer resin, polyphenylene oxide, polycarbonate, polyethylene terephthalate or polybutylene terephthalate may, for example, be mentioned.

To the polyamide resin to be used in the present invention, a plasticizer or an impact resistant agent may be incorporated. The plasticizer may, for example, be benzene sulfonic acid butyl amide, or an ester of p-hydroxybenzoic acid with a straight chain or branched chain alcohol having from 6 to 21 carbon atoms (such as 2-ethylhexyl p-hydroxybenzoate).

The plasticizer is incorporated preferably in an amount within a range not to reduce the burst pressure of the tube to be formed or not to create a problem of bleed out of the plasticizer. The blended amount of the plasticizer is usually from 0 to 30 parts by mass, preferably from 0 to 15 parts by mass, per 100 parts by mass of the polyamide resin component.

As the impact resistant agent, a rubber, an elastomer or a modified product thereof, such as, an ionomer, an ethylene/propylene copolymer, an ethylene/propylene terpolymer, a polystyrene/polyethylenebutylene block copolymer, a polystyrene/hydrogenated polyisoprene block copolymer or ethylene octene rubber, or a mixture thereof, may for example, be used. The amount of the impact resistant agent is preferably within a range not to reduce the burst pressure of the tube or not to create a problem in the weather resistance, and it is usually from 0 to 20 parts by mass, preferably from 0 to 10 parts by mass, per 100 parts by mass of the polyamide type resin component.

To the polyamide resin in the present invention, it is possible to incorporate, within a range not to impair its purpose, an antioxidant of e.g. a phenol type, a thioether type, a phosphite type or an amine type, an ultraviolet absorber of e.g. a salicylate type, a benzophenone type, a benzotriazol type, a cyanoacrylate type or a metal complex salt type, a weatherability-improver of HALS type, an antistatic agent such as an alkylamine, an alkylamide, an alkyl ether, an alkyl phenyl ether, a glycerol fatty acid ester, a sorbitan fatty acid ester, an alkyl sulfonate, an alkyl benzene sulfonate, an alkyl sulfate, an alkyl phosphate, a quaternary ammonium salt or an alkyl betaine, an inorganic flame retardant such as red phosphorus, zinc oxide, zirconium hydroxide, barium metabolate, aluminum hydroxide or magnesium hydroxide, an organic flame retardant of e.g. a halogen type, a phosphate type, a melamine or cyanuric acid type, a flame retardant assistant such as antimony trioxide, or others such as a nucleating agent, a lubricant, a pigment or a dye.

In the hose for fuel of the present invention, when the laminated structure comprising an inner layer (A) made of the above-described ETFE and an outer layer (B) made of PA, is to be formed, the following embodiments of lamination are available.

When ETFE adhesive to a polyamide resin is used as ETFE, PA is adhesive polyamide 12(a) satisfying the formula (1) or a mixture of polyamide 12(a) satisfying the formula (1) and polyamide 12(b) satisfying the formula (2), wherein the polyamides 12(a) and 12(b) are a mixture satisfying the formula (3) and are PA showing an adhesive strength of at least 20 N/cm to the inner layer (A):

$$[COOH]+[NH_2] \geq 2\times10^2/(17.8\eta_{r(a)}-19.1) \qquad (1)$$

$$[COOH]+[NH_2] < 2\times10^2/(17.8\eta_{r(b)}-19.1) \qquad (2)$$

$$\eta_{r(b)}-\eta_{r(a)} \geq 0.3 \qquad (3)$$

This is the embodiment as defined in claim 1.

Further, with respect to preferred examples of the functional groups to be introduced in the above-mentioned adhesive ETFE, an adhesive ETFE may be mentioned which has at least one functional group selected from the group consisting of a carboxyl group, a carboxylic anhydride residue, an epoxy group, a hydroxyl group, an isocyanate group, an ester group, an amide group, an aldehyde group, an amino group, a hydrolyzable silyl group, a cyano group, a carbon-carbon double bond, a sulfo group and an ether group, introduced, as defined in claim 2.

In the hose for fuel of the present invention, the adhesive strength between the inner layer (A) and the outer layer (B) is at least 20 N/cm, preferably at least 30 N/cm, more preferably at least 40 N/cm, most preferably at least 50 N/cm.

Particularly, in the present invention, such a high interlaminar adhesive strength can be obtained even at a high take-up speed of e.g. 50 m/min during the production of the hose for fuel. In other words, the present invention has a characteristic such that the dependency of the interlaminar adhesive strength on the take-up speed during the production of the hose for fuel is very small.

The combination of the functional group of adhesive PA and the functional group of adhesive ETFE is preferably selected to form a chemical bond. Namely, in a case where terminals of adhesive PA are amino group-excessive, it is preferred to select one wherein functional groups of adhesive ETFE are acidic groups. On the other hand, in a case where terminals of adhesive PA are carboxyl group excessive, it is preferred to select one wherein functional groups of adhesive ETFE are basic groups.

When the hose for fuel of the present invention is to be used for transportation of a liquid fuel, the inner layer, particularly the innermost material, is required to have an antistatic property. In such a case, the volume resistivity as an index of conductivity as a degree of the antistatic property, is preferably within a range of from 1 to $10^9$ Ω·cm with a view to providing the antistatic property effectively. The conductivity is preferably developed by incorporating a conductivity-imparting filler to the inner layer.

The conductivity-imparting filler may, for example, be a metal powder of e.g. copper, nickel or silver, a metal fiber of e.g. iron or stainless steel, carbon black, zinc oxide, glass beads or a metal inorganic compound such as titanium oxide having the surface coated by e.g. metal sputtering or electroless plating. Among them, carbon black is most preferred, since hydroxyl groups or carboxyl groups present on the surface of particles will serve as adhesive groups to improve the adhesive property of the inner layer.

The amount of the conductivity-imparting filler is suitably determined depending upon the type of the filler, the composition of ETFE and a fluororesin for forming the innermost layer, the designed conductivity performance of the hose for fuel, forming conditions, etc., but it is usually preferably at a level of from 1 to 30 parts by mass, particularly from 5 to 20 parts by mass, per 100 parts by mass of the resin constituting the inner layer such as ETFE.

The hose for fuel of the present invention basically has a laminated structure wherein adhesive PA and adhesive ETFE are laminated, but it may be one having the following layer structure. Namely, it may have a multilayer structure, such as (1) a three layer hose of PA/adhesive PA/adhesive ETFE (which may or may not be conductive) or adhesive PA/adhesive ETFE/fluororesin (which may or may not be conductive), (2) a four layer hose of PA/adhesive PA/adhesive ETFE/fluororesin (which may or may not be conductive), or adhesive PA/adhesive ETFE/fluororesin/conductive fluororesin, or (3) a five layer hose of PA/adhesive PA/adhesive ETFE/fluororesin/conductive fluororesin. Here, as a fluororesin other than adhesive ETFE, usual ETFE or tetrafluoroethylene/hexafluoropropylene copolymer is preferred. These multilayer structures correspond to the constructions as defined in claims 5 to 12.

The size of the hose for fuel of the present invention is not particularly limited, but the outer diameter is preferably within a range of from 5 to 30 mm, and the inner diameter is preferably within a range of from 3 to 25 mm. Further, the thicknesses of the respective layers constituting the hose for fuel are not particularly limited, but they are preferably within a range of from 0.05 to 2.0 mm, respectively. As an example, a hose for fuel having an outer diameter of 8 mm, an inner diameter of 6 mm and a thickness of 1 mm (inner layer: 0.2 mm, outer layer: 0.8 mm) may be mentioned.

A method for forming the hose for fuel having a layered structure of the present invention, may, for example, be a method wherein cylindrical inner and outer layers are separately formed by an extruder, and the outer layer is coated on the inner layer by a heat shrinkage tube, or a method wherein an inner layer tube is firstly formed by an inner layer extruder and then on the outer surface, an outer layer is formed by an outer layer extruder. However, it is most preferred to prepare it by coextrusion molding whereby adhesive PA constituting an outer layer and adhesive ETFE constituting an inner layer are coextruded in a molten state, and the two are heat-fused (melt-bonded) to form a hose having a double layer structure in one step.

Also in a case where the hose has a laminated structure of three or more layers, coextrusion molding can be carried out in the same manner.

Usually, the respective resins for the outer layer and the inner layer are preferably preliminarily pelletized. Namely, to ETFE or a polyamide resin, predetermined amounts of a resin to be mixed and various additives such as a plasticizer, are mixed by means of a low speed rotary mixer such as a V-type blender or a tumbler or a high speed rotary mixer such as a Henschel mixer, followed by melt-kneading by e.g. a single screw extruder, a twin screw extruder or a double shaft kneading machine for pelletizing. Here, an additive which is liquid at room temperature such as a plasticizer, may be injected to the cylinder of a melt-kneading machine for melt-kneading. It preferred to carry out pelletizing by mechanical kneading at a temperature where all resin components will melt. In order to uniformly mix a conductivity-imparting filler to a fluororesin, it is particularly preferred to employ a same directional twin screw extruder.

Further, it is also preferred that when coextrusion molding is carried out, all constituting elements for forming the compositions of the respective layers are, respectively, supplied to hoppers of an extruder, and compounding, grafting, etc. for the respective layers are carried out in the extruder, followed by coextrusion molding, so that compounding, grafting, etc. as well as coextrusion molding are carried out substantially at the same time.

In the present invention, the properties of a polyamide resin and various physical properties of a hose for fuel, were measured by the following methods.

Measurement of Terminal Carboxyl Group Concentration of a Polyamide Resin

Into a three neck flask, a predetermined amount of a polyamide sample was put, and 40 ml of benzyl alcohol was added. Then, the flask was immersed in an oil bath set at 180° C. under a nitrogen stream. Stirring was carried out by a stirrer motor attached at an upper portion, and titration was carried out with N/20 of potassium hydroxide (ethanol solution) using phenol phthalein as an indicator, whereupon the normal concentration was obtained by the following formula.

$$[COOH] = COOH \text{ equivalent}/10^5 \text{ g}$$

Measurement of Terminal Amino Group Concentration of a Polyamide Resin

Into a three neck flask equipped with stopcocks, a predetermined amount of a polyamide sample was put, and 40 ml of a preliminarily prepared solvent phenol/methanol (volume ratio: 9/1) was added, followed by stirring with a magnet stirrer for dissolution. Then, titration was carried out with N/20 hydrochloric acid using thymol blue as an indicator, and the normal concentration was obtained by the following formula.

$$[NH_2]=NH_2 \text{ equivalent}/10^5 \text{ g}$$

Measurement of Relative Viscosity ($\eta_r$) of a Polyamide Resin

In accordance with JIS K6810, a polyamide sample is completely dissolved at a concentration of 10 g/dm$^3$ using 98 mass % sulfuric acid as a solvent, whereupon the relative viscosity is measured at 25° C. by means of an Ubbellohde viscometer.

Measurement of Adhesive Strength (Melt Bond Strength)

An extrusion molded hose (a laminated hose) is cut into a length of 20 cm, and it is further longitudinally cut to obtain a sample. The outer layer and the inner layer are forcibly peeled for 1 cm from the end, and by means of a small size tensilone, the outer layer and the inner layer are nipped, and one of them is pulled at a rate of 30 mm/min. The maximum strength is taken as the adhesive strength (N/cm). In the present invention, the adhesive strength of the hose for fuel is preferably at least 20 N/cm, more preferably at least 30 N/cm, still more preferably at least 40 N/cm, most preferably at least 50 N/cm. Further, its dependency on the take-up speed during the production of a hose, is preferably as small as possible, and it is preferably at least 20 N/cm even when the take-up speed is as high as 50 m/min.

Measurement of Conductivity

Evaluated from the results of measurement of the volume resistivity. An inner layer obtained by peeling at the time of measurement of the adhesive strength is used as a sample. Using a measuring apparatus such as Loresta AP (manufactured by Mitsubishi Chemical Corporation), a four probe is brought in contact with the sample under a load of 10 N, whereupon the volume resistivity (Ω·cm) is measured. In the present invention, the volume resistivity of the inner layer is preferably at a level of from 1 to $10^9$ Ω·cm.

Measurement of Gas Barrier Property

One obtained by cutting a laminate hose into a length of 10 cm is used as a sample. The sample is dried at 110° C. for two hours, and the mass is measured. Then, a fuel is sealed therein and both ends are sealed. This hose is set in a constant temperature tank of 60° C. 24 hours later, the hose is taken out and returned to room temperature, whereupon the mass is measured. The change in mass is divided by the inner layer surface area and 24 hours to calculate the fuel permeation coefficient (g/m$^2$·day).

Here, when a mixed fuel of isooctane/toluene (volume ratio: 1/1) is used as the test fuel, the fuel permeation coefficient is preferably less than 6 (g/m$^2$·day), more preferably less than 0.5 (g/m$^2$·day), most preferably less than 0.1 (g/m$^2$·day). In order to sufficiently secure the gas barrier property, the thickness of the inner layer (ETFE) is preferably at least 0.1 mm. Particularly preferred is a layered structure of at least two layers of an inner layer (A) and a fluororesin layer, and the total thickness is preferably at least 0.1 mm.

Now, the present invention will be described in further detail with reference to Preparation Examples, Working Examples and Comparative Examples. However, it should be understood that the present invention is by no means restricted by such specific Examples.

Pellets of polyamides and ETFE to form the outer layers and the inner layers of hoses, were prepared by the following Preparation Examples 1 to 10.

Preparation Examples 1

Polyamide Pellets 1

100 parts by mass of 12-aminododecanoic acid and 0.5 part by mass of tris(2-aminoethyl)amine were subjected to melt polycondensation in a polymerization tank to prepare polyamide 12(a). The molten polymer withdrawn from a lower portion of the polymerization tank was cooled by a chiller and then palletized by a pelletizer (hereinafter the obtained pellets will be referred to as PA pellets 1). With respect to PA pellets 1, the relative viscosity, the terminal carboxyl group concentration, and the terminal amino group concentration were measured, whereby the relative viscosity $\eta_{r(a)}$=2.3, and [COOH]+[NH$_2$]=12.5.

Thus, it was confirmed to be polyamide 12(a) satisfying the relation of the formula (1), as [COOH]+[NH$_2$]=(12.5) substantially exceeds the right side of the formula (1)=2×10$^2$/(17.8$\eta_{r(a)}$−19.1)=9.2.

Preparation Examples 2

Polyamide Pellets 2

Polyamide pellets 2 are pellets of a mixture of the above polyamide 12(a) and polyamide 12(b). The polyamide 12(b) had a relative viscosity $\eta_{r(b)}$=2.87 and [COOH]+[NH$_2$]=5.5.

Thus, it was confirmed to be polyamide 12(b) satisfying the relation of the formula (2), as [COOH]+[NH$_2$](=5.5) is less than the right side of the formula (2)=2×10$^2$/(17.8$\eta_{r(b)}$−19.1)=6.3.

Further, $\eta_{r(b)}$−$\eta_{r(a)}$=0.57≦0.3, and thus the polyamides 12(a) and 12(b) satisfy the relation of the formula (3).

30 mass % of PA pellets 1 made of polyamide 12(a) and 70 mass % of the above polyamide 12(b) were mixed by melt kneading at a temperature of 240° C. for a retention time of 3 minutes by means of a same directional twin screw extruder (TEM-75SS, manufactured by Toshiba Machine Co., Ltd.). The molten mixture discharged from the extruder was cooled by a chiller and palletized by a pelletizer (the obtained pellets will hereinafter be referred to as PA pellets 2).

Preparation Examples 3

Resin A

By suspension polymerization, ETFE (polymerized units of ethylene/tetrafluoroethylene/(perfluorobutyl)ethylene=58/40.5/1.5 (molar ratio) (hereinafter referred to as resin A) was prepared.

Preparation Examples 4

Resin B

By solution polymerization, ETFE (polymerized units of ethylene/tetrafluoroethylene/vinyl acetate/(perfluorobutyl)ethylene=58/37/4.5/0.5 (molar ratio) (hereinafter referred to as resin B) was prepared.

Preparation Examples 5

Pellets 3 (Adhesive ETFE)

100 mass % of resin A prepared in Preparation Example 3, 1.5 parts by mass of maleic anhydride and 0.2 part by mass of tert-butyl hydroperoxide were supplied to a same directional twin screw extruder (TEM-48SS, manufactured by Toshiba Machine Co., Ltd.) and kneaded for a retention time of 5 minutes while maintaining the temperature of the melting zone of the cylinder at 300° C. A discharged strand was cooled with water and cut by a pelletizer to obtain pellets. The pellets were dried in an electric oven at 120° C. for 10 hours to remove the water content. The dried pellets will be referred to as pellets 3.

Preparation Examples 6

Pellets 4 (Adhesive ETFE)

Dry pellets were obtained in the same manner as in Preparation Example 5 except that 100 parts by mass of resin A prepared in Preparation Example 3, 1.5 parts by mass of maleic anhydride, 0.2 part by mass of tert-butyl hydroperoxide and 11 parts of carbon black (manufactured by Denki Kagaku Kogyo Kabushiki Kaisha) were used. The pellets will be referred to as pellets 4.

Preparation Examples 7

Pellets 5 (Adhesive ETFE)

Kneading was carried out in the same manner as in Preparation Example 5 except that 100 parts by mass of resin A prepared in Preparation Example 3 and 0.2 part by mass of tert-butyl hydroperoxide were used, the temperature of the melting zone of the cylinder was changed to 350° C., and the retention time was changed to 3 minutes. From the discharged strand, dry pellets were obtained in the same manner as in Preparation Example 5. The pellets will be referred to as pellets 5.

Preparation Examples 8

Pellets 6 (Adhesive ETFE)

Kneading was carried out in the same manner as in Preparation Example 5 except that 100 parts by mass of resin B prepared in Preparation Example 4 and 0.8 part by mass of di-tert-butylperoxide were used, the temperature of the melting zone of the cylinder was changed to 280° C., and the retention time was changed to 3 minutes. From the discharged strand, dry pellets were obtained in the same manner as in Preparation Example 5 except that the drying time was changed to two hours. The pellets will be referred to as pellets 6.

Preparation Examples 9

Pellets 7 (Adhesive ETFE)

Kneading was carried out in the same manner as in Preparation Example 5 except that 100 parts by mass of resin B prepared in Preparation Example 4, 0.8 part by mass of di-tert-butylperoxide and 12 parts by mass of carbon black (manufactured by Denki Kagaku Kogyo Kabushiki Kaisha) were used, the temperature of the melting zone of the cylinder was changed to 270° C., and the retention time was 5 minutes. From the discharged strand, dry pellets were obtained in the same manner as in Preparation Example 5 except that the drying temperature was changed to 110° C., and the drying time was changed to 3 hours. The pellets will be referred to as pellets 7.

Preparation Examples 10

Pellets 8

Dried pellets were obtained in the same manner as in Preparation Example 5 except that 100 parts by mass of ETFE (Aflon LM740A, manufactured by Asahi Glass Company, Limited) and 15 parts by mass of carbon black (manufactured by Denki Kagaku Kogyo Kabushiki Kaisha) were used. The pellets will be referred to as pellets 8.

In the folowing Examples of the present invention (Examples 1 to 12) and Comparative Examples (Examples 13 and 14), hoses were multilayer coextruded by using mainly pallets 1 to 8 obtianed as described above.

EXAMPLE 1

Using a 50 mmΦ extruder (length (L)/diameter (D)=25, FS50-25, manufactured by Ikegai K.K.), PA pellets 1 were supplied to a cylinder for forming an outer layer of a hose and melted at 270° C. Further, using a 30 mmΦ extruder (L/D=24, VS-30, manufactured by Tanabe Plastic K.K.), pellets 4 were supplied to a cylinder for forming an inner layer and melted at 320° C. Double layer coextrusion was carried out at a coextrusion die temperature of 250° C. and at a take-up speed of 10 m/min to obtain a laminated hose having an outer diameter of 8 mm and an inner diameter of 6 mm. The adhesive strength, the volume resistivity of the inner layer, and the gas barrier property of the tube, were measured, and the results are shown in Table 1.

EXAMPLE 2

Using a 50 mmΦ extruder (L/D=25, FS50-25, manufactured by Ikegai K.K.), polyamide 12 (3030JLX2, manufactured by Ube Industries, Ltd.) was supplied to a cylinder for forming an outer layer of a hose; using a 40 mmΦ extruder (L/D=24, VS-40, manufactured by Tanabe Plastic K.K.), PA pellets 2 were supplied to a cylinder for forming an interlayer, and further using a 30 mmΦ extruder (L/D=24, VS-30, manufactured by Tanabe Plastic K.K.), pellets 5 were supplied to a cylinder for forming an inner layer. Three layer coextrusion was carried out at a coextrusion die temperature of 250° C. at a take-up speed of 10 m/min to obtain a laminated hose having an outer diameter of 8 mm and an inner diameter of 6 mm. The adhesive strength, the volume resistivity of the inner layer, and the gas barrier property of the tube, were measured, and the results are shown in Table 1.

EXAMPLE 3

PA pellets 1 were supplied to a cylinder for forming an outer layer of a hose, and pellets 6 were supplied to a cylinder for forming an inner layer, and double layer coextrusion was carried out in the same manner as in Example 1 except that the coextrusion die temperature was 260° C., and the take-up speed was 15 m/min, to obtain a laminated hose having an outer diameter of 8 mm and an inner diameter of 6 mm. The adhesive strength, the volume resistivity of the inner layer, and the gas barrier property of the tube, were measured, and the results are shown in Table 1.

EXAMPLE 4

Double layer coextrusion was carried out in the same manner as in Example 1 except that PA pellets 2 were supplied to the cylinder for forming an outer layer of a hose, and pellets 7 were supplied to the cylinder for forming an inner layer, to obtain a laminated hose having an outer diameter of 8 mm and an inner diameter of 6 mm. The adhesive strength, the volume resistivity of the inner layer, and the gas barrier property of the tube, were measured, and the results are shown in Table 1.

EXAMPLE 5

Three layer coextrusion was carried out in the same manner as in Example 2 except that PA pellets 1 were supplied to the cylinder for forming an outer layer of a hose, pellets 3 were supplied to the cylinder for forming an interlayer, and 200 parts by mass of carbon black (manufactured by Denki Kagaku Kogyo Kabushiki Kaisha) per 100 parts by mass of ETFE (Aflon LM740A, manufactured by Asahi Glass Company, Limited) was supplied to the cylinder for forming an inner layer, to obtain a laminated hose. The adhesive strength, the volume resistivity of the inner layer, and the gas barrier property of the tube, were measured, and the results are shown in Table 1.

EXAMPLES 6 and 7

Three layer coextrusion was carried out in the same manner as in Example 5 except that the take-up speed was changed to a high speed as shown in Table 1, to obtain a laminated hose. The adhesive strength, the volume resistivity of the inner layer, and the gas barrier property of the tube, were measured, and the results are shown in Table 1.

EXAMPLE 8

Three layer coextrusion was carried out in the same manner as in Example 5 except that pellets 6 were supplied to the cylinder for forming an interlayer, and the take-up speed was changed to 50 m/min, to obtain a laminated hose. The adhesive strength, the volume resistivity of the inner layer, and the gas barrier property of the tube, were measured, and the results are shown in Table 2.

EXAMPLES 9 to 12

Multilayer coextrusion was carried out in the same manner as in Example 3 except that the materials as identified in Table 2 were employed, and the number of layers was changed as disclosed in Table 2 to obtain a multilayer laminated hose. The adhesive strength, the volume resistivity of the inner layer, and the gas barrier property of the tube, were measured, and the results are shown in Table 2.

EXAMPLE 13

Comparative Example

Double layer coextrusion was carried out in the same manner as in Example 1 except that polyamide 12 (3030JLX2, manufactured by Ube Industries, Ltd.) was supplied to the cylinder for forming an outer layer of a hose, and ETFE (Aflon LM730A, manufactured by Asahi Glass Company, Limited) was supplied to the cylinder for forming an inner layer, to obtain a laminated hose having an outer diameter of 8 mm and an inner diameter of 6 mm. The adhesive strength, the volume resistivity of the inner layer, and the gas barrier property of the tube, were measured, and the results are shown in Table 2.

EXAMPLE 14

Comparative Example

Using the same extruders as in Example 2, polyamide 12 (3030JLX2, manufactured by Ube Industries, Ltd.) was supplied to the cylinder for forming an outer layer of a hose, pellets 3 were supplied to the cylinder for forming an interlayer, and 100 parts by mass of ETFE (Aflon LM730A, manufactured by Asahi Glass Company, Limited) and 20 parts by mass of carbon black (manufactured by Denki Kagaku Kogyo Kabushiki Kaisha) were supplied to the cylinder for forming an inner layer and melt kneaded at 300° C. Three layer coextrusion was carried out at a coextrusion die temperature of 250° C. at a take-up speed of as high as 50 m/min to obtain a laminated hose having an outer diameter of 8 mm and an inner diameter of 6 mm. The adhesive strength, the volume resistivity of the inner layer, and the gas barrier property of the tube, were measured, and the results are shown in Table 2.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Layered structure | Outer layer | 5 4 |  | PA12 | PA | PA | PA | PA | PA |
|  | Inner layer | 3 | pellets 1 | pellets 2 | pellets 1 | Pellets 2 | pellets 1 | pellets 1 | Pellets 1 |
|  |  | 2 | Pellets 4 | Pellets 5 | Pellets 6 | Pellets 7 | Pellets 3 | Pellets 3 | Pellets 3 |
|  |  | 1 |  |  |  |  | LM (CB) | LM (CB) | LM (CB) |
| Number of layers |  |  | 2 layers | 3 layers | 2 layers | 2 layers | 3 layers | 3 layers | 3 layers |
| Take-off speed | M/min |  | 10 | 10 | 15 | 15 | 10 | 30 | 50 |
| Adhesive strength | N/cm |  | 53 | 58 | 51 | 46 | 66 | 61 | 55 |
| Volume resistivity | $\Omega \cdot cm$ |  | $10^2$ | $>10^{16}$ | $>10^{16}$ | $10^3$ | $10^2$ | $10^2$ | $10^3$ |
| Gas barrier property | $g/m^2 \cdot day$ |  | <0.001 | <0.001 | <0.001 | <0.001 | <0.001 | <0.001 | <0.001 |

Note:
The same absorviations apply to Table 2.
LM: Aflon LM 720A, manufactured by Asahi Glass Company, Limited.
PA11: polyamide, BESN P20TL, manufactured by Atochem Co.
PA12: polyamide, 3030JLX2, manufactured by Ube Industries, Ltd.
CB: Carbon black, manufactured by Denki Kagaku Kogyo Kabushiki Kaisha
LM (CB): Composition prepared by mixing LM and CB in a mass ratio of LM/CB = 100/20.

TABLE 2

|  |  |  | Ex. 8 | Ex. 9 | Ex. 10 | Ex. 11 | Ex. 12 | Ex. 13 | Ex. 14 |
|---|---|---|---|---|---|---|---|---|---|
| Layered structure | Outer layer | 5 4 |  |  | PA11 PA | PA12 PA | PA11 PA | PA12 | PA12 |
|  | Inner layer | 3 | PA pellets 1 | PA pellets 1 | PA pellets 2 | Pellets 2 | pellets 1 |  |  |
|  |  |  | Pellets 6 | Pellets 3 | Pellets 3 | Pellets 6 | Pellets 3 | LM | Pellets 3 |

TABLE 2-continued

|  |  | Ex. 8 | Ex. 9 | Ex. 10 | Ex. 11 | Ex. 12 | Ex. 13 | Ex. 14 |
|---|---|---|---|---|---|---|---|---|
|  | 2 | LM (CB) | LM | Pellets 8 | Pellets 8 | LM | | LM (CB) |
|  | 1 | | | | | Pellets 8 | | |
| Number of layers | | 3 layers | 4 layers | 4 layers | 4 layers | 5 layers | 2 layers | 3 layers |
| Take-off speed | M/min | 50 | 10 | 10 | 10 | 10 | 10 | 50 |
| Adhesive strength | N/cm | 55 | 67 | 67 | 67 | 68 | 7 | 18 |
| Volume resistivity | Ω·cm | $10^3$ | $10^2$ | $10^2$ | $10^2$ | $10^2$ | $>10^{16}$ | $10^3$ |
| Gas barrier property | g/m²·day | <0.001 | <0.001 | <0.001 | <0.001 | <0.001 | <0.001 | <0.001 |

As shown in Tables 1 and 2, in the present invention, even when the take-up speed (m/min) is increased from 10 to 30 or even to 50 (Examples 5 to 7), the adhesive strength (N/cm) is maintained at a level of 66, 61 or 55, and it can be said that the adhesive strength does not substantially depend on the take-up speed. In this respect, it is evident that in Comparative Example (Example 14), if the take-up speed (m/min) is set to be 50, the adhesive strength (N/cm) will decrease to 18.

The entire disclosures of Japanese Patent Application No. 2000-121926 filed on Apr. 24, 2000 and Japanese Patent Application No. 2001-98059 filed on Mar. 30, 2001 including specifications, claims and summaries are incorporated herein by reference in their entireties.

What is claimed is:

1. A hose for fuel having a laminated structure, comprising:

an inner layer made of an ethylene/tetrafluoroethylene copolymer and an outer layer made of a polyamide resin, wherein the inner layer adheres to the polyamide resin of the outer layer, and the outer layer is made of polyamide 12(a) that satisfies formula (1), or a mixture of polyamide 12(a) that satisfies formula (1) and polyamide 12(b) that satisfies formula (2), wherein polyamides 12(a) and 12(b) satisfy formula (3) and are polyamide resins showing an adhesive strength of at least 20 N/cm to the inner layer:

$$[COOH]+[NH_2] \geq 2\times 10^2/(17.8\eta_{r(a)}-19.1) \quad (1)$$

$$[COOH]+[NH_2] < 2\times 10^2/(17.8\eta_{r(b)}-19.1) \quad (2)$$

$$\eta_{r(b)}-\eta_{r(a)} \geq 0.3 \quad (3)$$

wherein [COOH] is the equivalent concentration of polyamide terminal carboxyl groups, [NH₂] is the equivalent concentration of polyamide terminal amino groups, and $\eta_{r(a)}$ and $\eta_{r(b)}$ are the relative viscosities of polyamides 12(a) and 12(b), respectively.

2. The hose for fuel according to claim 1, wherein said ethylene/tetrafluoroethylene copolymer is an adhesive polymer having at least one functional group selected from the group consisting of a carboxyl group, a carboxylic anhydride residue, an epoxy group, a hydroxyl group, an isocyanate group, an ester group, an amide group, an aldehyde group, an amino group, a hydrolyzable silyl group, a cyano group, a carbon-carbon double bond, a sulfo group and an ether group.

3. The hose for fuel according to claim 1, wherein the adhesive ethylene/tetrafluoroethylene copolymer is an ethylene/tetrafluoroethylene/vinyl acetate/(perfluoroalkyl) ethylene copolymer wherein the molar ratio of polymerized units based on ethylene to polymerized units based on tetrafluoroethylene is from 30/70 to 70/30, and based on the total number of mols of polymerized units based on ethylene and tetrafluoroethylene, polymerized units based on vinyl acetate are from 0.1 to 15 mol %, and polymerized units based on (perfluoroalkyl)ethylene are from 0.01 to 5 mol %.

4. The hose for fuel according to claim 1, wherein the volume resistivity of the adhesive ethylene/tetrafluoroethylene copolymer of the inner layer ranges from 1 to $10^9$ Ω·cm.

5. The hose for fuel according to claim 1, wherein said outer layer is bonded to an outermost layer made of a polyamide resin.

6. The hose for fuel according to claim 1, wherein said outer layer is bonded to an outermost layer made of a polyamide resin and said inner layer is bonded to an innermost layer made of a fluororesin.

7. The hose for fuel according to claim 1, wherein the volume resistivity of the fluororesin of the innermost layer ranges from 1 to $10^9$ Ω·cm.

8. The hose for fuel according to claim 1, wherein the inner layer and the outer layer are formed by co-extrusion molding.

9. The hose for fuel according to claim 1, wherein said ethylene/tetrafluoroethylene copolymer is prepared by copolymerizing ethylene and tetrafluoroethylene with at least one comonomer selected from the group consisting of a perfluorovinyl ether monomer of the formula $R_f(OCFXCF_2)_mOCF=CF_2$ wherein $R_f$ is a perfluoroalkyl group, X is a fluorine atom or a trifluoromethyl group and m is an integer of 1 to 6, a perfluorovinyl ether monomer having a group readily convertible to a carboxylic acid group or a sulfo group, a vinyl ester monomer, a vinyl ether monomer and an allyl ether monomer.

10. The hose for fuel according to claim 1, wherein the laminated structure of the hose is a three layer structure of PA/adhesive PA/adhesive ETFE or adhesive PA/adhesive ETFE/fluororesin, a four layer structure of PA/adhesive PA/adhesive ETFE/fluororesin or adhesive PA/adhesiveETFE/fluororesin/conductive fluororesin or a five layer structure of PA/adhesive PA/adhesive ETFE/fluororesin/conductive.

11. The hose for fuel according to claim 1, wherein said inner layer is bonded to an innermost layer made of a fluororesin.

12. The hose for fuel according to claim 11, wherein the volume resistivity of the fluororesin of the innermost layer ranges from 1 to $10^9$ Ω·cm.

13. The hose for fuel according to claim 11, wherein the volume resistivity of the fluororesin of the innermost layer ranges from 1 to $10^9$ Ω·cm.

14. The hose for fuel according to claim 13, wherein said outer layer is bonded to an outermost layer made of a polyamide resin.

* * * * *